(12) United States Patent
Ananthanarayanan et al.

(10) Patent No.: US 7,818,273 B2
(45) Date of Patent: Oct. 19, 2010

(54) SYSTEM AND METHOD FOR CORTICAL SIMULATION

(75) Inventors: Rajagopal (Ananth) Ananthanarayanan, San Jose, CA (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/857,212

(22) Filed: Sep. 18, 2007

(65) Prior Publication Data

US 2009/0076993 A1   Mar. 19, 2009

(51) Int. Cl.
  G06E 1/00   (2006.01)
(52) U.S. Cl. .............................. 706/15; 703/11; 706/25; 706/44
(58) Field of Classification Search ................... 706/44, 706/14, 15, 25, 26; 703/11
  See application file for complete search history.

(56) References Cited

U.S. PATENT DOCUMENTS

| | | | |
|---|---|---|---|
| 3,351,773 A | 11/1967 | Wolf et al. | |
| 4,518,866 A | 5/1985 | Clymer | |
| 5,343,555 A | 8/1994 | Yayla et al. | |
| 5,386,497 A | 1/1995 | Torrey | |
| 5,444,822 A | 8/1995 | Shinohara | |
| 5,772,443 A | 6/1998 | Lampotang et al. | |
| 7,430,546 B1 * | 9/2008 | Suri ............................ | 706/16 |
| 2006/0199159 A1 | 9/2006 | Ghiron et al. | |
| 2007/0010737 A1 | 1/2007 | Harvey et al. | |
| 2007/0106479 A1 | 5/2007 | Geerts et al. | |
| 2008/0162391 A1 * | 7/2008 | Izhikevich ................... | 706/25 |

FOREIGN PATENT DOCUMENTS

DE   19841820   3/2000

OTHER PUBLICATIONS

Mehrtash et al. Synaptic Plasticity in Spiking Neural Networks (SP2INN): A System Approach. IEEE Transactions on Neural Networks, vol. 14, No. 5, Sep. 2003; pp. 980-992.*
Glackin et al. A Novel Approach for the Implementation of Large Scale Spiking Neural Networks on FPGA Hardware. IWANN 2005, LNCS 3512, pp. 552-563, 2005.*
Mouraud et al. A Distributed and Multithreaded Neural Event Driven Simulator Framework. Proceedings of the 24th IASTED International Multi-Conference Parallel and Distributed Computing and Networks. Feb. 14-16, 2006, Innsbruck, Austria; pp. 212-217.*
Paugam-Moisy. Spiking Neuron Networks: A Survey. IDIAP Research Report. Feb. 2006; pp. 1-42.*
Ananathanarayanan et al. Anatomy of a Cortical Simulator, SC07 Nov. 10-16, 2007.*
D'Haene et al., Accelerating Event Based Simulation for Multi-synapse Spiking Neural Networks. International Conference on Artificial Neural Networks 2006, Part I, LNCS 4131, pp. 760-769, 2006.*

(Continued)

*Primary Examiner*—Donald Sparks
*Assistant Examiner*—David H Kim
(74) *Attorney, Agent, or Firm*—John L. Rogitz (57) ABSTRACT

A cortical simulator optimizing the simulation scale and time through computationally efficient simulation of neurons in a clock-driven and synapses in an event-driven fashion, memory efficient representation of simulation state, and communication efficient message exchanges.

1 Claim, 7 Drawing Sheets

HIGH LEVEL LOGIC OF EACH LOOP

OTHER PUBLICATIONS

Wittie, L.D. "Large Scale Simulation of Brain Cortices" Simulation Journal 9-78, p. 73-78, 1978.

Ananthanarayanan et al., "Anatomy of a Cortical Simulator" SC07 Nov. 10-16, 2007.

G. Almasi et al. Optimization of MPI Collective communication on BlueGene/L systems. Int. Conf. Supercomputing, pp. 253-262, 2005.

R. Ananthanarayanan and D.S. Modha, Scaling, stability and synchronizing in mouse-sized (and larger) cortical simulations. Inc. CNS2007. BMC Neurosci., 8(Suppl 2): P187, 2007.

R. Brette et al. simulation of networks of spiking neurons: A review of tools and strategies. J. Comput. Neurosci. (submitted), 2006.

E. Chan, R. Van De Geijn, W. Gropp, and R. Thakur. Collective communication on architectures that support simultaneous communication over multiple links. In PPoPP, pp. 2-11, 2006.

A. Delorme and S. Thorpe, SpikeNET: An event-driven simulation package for modeling large networks of spiking neurons. Network: Comput. Neural Syst., 14:613-627, 2003.

N. Fourcaud and N. Brunel. Dynamics of the firing probability of noisy integrate-and-fire neurons. Neural Comput., pp. 2057-2110, 2002.

A. Gara et al. Overview of the BlueGene/L Supercomputer. IBM J. REs. Devel., 49:195-212, 2005.

S. Hill and G. Tononi. Modeling sleep and wakefulness in the thalamacortical system. J. Neurophysiol., 93: 1671-1698, 2005.

E.M. Izhikevich. Polychronization: Computation with spikes. Neural Comput., 18: 245-282, 2006.

E.M. Izhikevich et al. Spike-timing dynamics of neuronal groups. Cebral Cortz, 14:933-944, 2004.

C.Johansson and A. Lansner. Towards cortex sized artificial neural systems. Neural Networks, 20(1):48-61, 2007.

M. Mattia and P.D. Guidice, Efficient event-driven simulation of large networks of spiking neurons and dynamical synapses. Neural Comput., 12:2305-2329, 2000.

A. Morrison, C. Mehring, T.Geisel, A.D Aertsen and M. Diesmann. Advancing the boundaries of high-connectivity network simulation with distributed computing. Neural Comput., 17(8): 1776-1801, 2005.

E. Ros, R. Carrillo, E. Ortigosa, B. Barbour and R. Agis. Event-driven simulation scheme for spiking neuronal dynamics. Neural Comput., 18:2959-2993, 2006.

S. Song, K.D. Miller and L.F. Abbott, Competitive Hebbian learning through spike-timing-dependent synaptic plasticity. Nature Neurosci., 3:919-929, 2000.

R. Thakur, R. Rabenseifner and W. Gropp. Optimization of collective communication operations in MPICH. Int. J. High Perf. Comput. App., 19(1):49-66, 2005.

T.P. Vogels, K. Rajan and L.F. Abbott. Neural network dynamics. Annu. Rev. Neuroscienc, 28:357-376, 2005.

L. Watts. Event-driven simulation of networks of spiking neurons. In NIPS, vol. 6, pp. 927-934, 1994.

* cited by examiner

OVERALL LOGIC

HIGH LEVEL LOGIC OF EACH LOOP

SynAct1 (Process current events) Activate synapses in the set $E(\text{mod}(t,\delta) + 1)$.

SynAct2 (Generate future events) For each set $S(n,d)$ in $E(\text{mod}(t,\delta) + 1)$, if there exists a delay $d'$ such that $d < d' \geq \delta$ and $S(n,d')$ is non-empty, then insert $S(n,d')$ in the set $E(\text{mod}(t + d'- d,\delta) +1)$. Finally, clear the set $E(\text{mod}(t,\delta)+1)$.

DSTDP For each synapse that is activated,

1. Update the state of the post-synaptic neuron $n$ by the associated synaptic weight.

2. If the synapse if excitatory, depress the synapse according to STDP and put the synapse on the list of recently activated synapses $R(n)$ for the corresponding neuron $n$.

B2 Set the list $F$ of fired neurons to be empty set.

NrnUpd For each neuron $n$, with some stimulus probability, provide it with a super-threshold stimulus, update its state, and if it fires, then (a) reset the neuron state, (b) add the neuron to list $F$, and (c)

N1 insert set $S(n,\underline{D}(n))$ into the event set $E(\text{mod}(t+\underline{D}(n),\delta) +1)$.

PSTDP For every neuron $n$ in list $F$, and for each of its synapse on the list $R(n)$, reward the synapse according to STDP, Clear the list $R(n)$.

SINGLE PROCESSOR LOGIC

FIG. 5

B1 $x$ = MPI_Comm_rank(), $N$ = MPI_Comm_size().

SynAct1 (Process current events) Activate synapses in the set $E^x(\text{mod}(t,\delta) + 1)$.

SynAct2 (Generate future events) For each set $S((m,z),d;x)$ in $E^x(\text{mod}(t,\delta) + 1)$, if there exists a delay $d'$ such that $d < d' \le \delta$ and $S((m,z),d';x)$ is non-empty, then insert $S((m,z),d';x)$ in the set $E^x(\text{mod}(t + d' - d,\delta) +1)$. Finally, clear the set $E^x(\text{mod}(t,\delta)+1)$.

DSTDP For each synapse that is activated,

1. Update the state of the post-synaptic neuron $n$ by the associated synaptic weight.

2. If the synapse if excitatory, depress the synapse according to STDP and put the synapse on the list of recently activated synapse $R(n)$ for the corresponding neuron $n$.

B2 Set the list $F$ of fired neurons to empty set. Initialize $M_x(y)=0, 1 \le y \le N$.

NrnUpd For each neuron $n$, with some stimulus probability, provide it with a super-threshold stimulus, update its state, and if it fires, then (a) reset the neuron state, (b) add the neuron to list $F$, and (c) if the neuron connects to any synapse on processor $y$, then prepare to send a message $(n,x)$ to processor $y$ by adding $n$ to a message destined from $x$ to $y$. If the message becomes full, then send it using MPI_Isend. Increment the number of messages sent $M_x(y)$.

FlshMsg Flush any non-empty, non-full messages destined for any processor $y$ using MPI_Isend. Increment the number of messages sent $M_x(y)$ by 1.

PSTDP For every neuron $n$ in list $F$, and for each of its synapse on the list $R(n)$, reward the synapse according to STDP. Clear the list $R(n)$.

MeX1 Using MPI_ReduceScatter send $M_x(1),..., M_x(N)$ to processor 0 and receive the count of incoming messages to this processor $M(x) =\sum_{y=1}^{N} M_y(x)$.

MeX2 Using MPI_Recv, receive $M(x)$ messages each of the form $(m,z)$. Now, for each message,

N1 Insert set $S((m,z), \underline{D}(m,z;x);x)$ into the event set $E^x(\text{mod}(t +\underline{D}(m,z;x),\delta)+1)$.

SYSTEM AND METHOD FOR CORTICAL SIMULATION

I. FIELD OF THE INVENTION

The present invention relates generally to cortical simulators.

II. BACKGROUND OF THE INVENTION

The cerebral cortex is believed to be the seat of cognition. Unraveling the computational and operational function of the cortex is a grand challenge with enormous implications for cognitive computing. Large-scale computerized cortical simulations provide one avenue for computationally exploring hypotheses about how the cortex works, what it computes, and how, eventually, it may be mechanized.

A simple view of the cortex is that it consists of discrete neurons. Each neuron receives inputs from thousands of other neurons via its dendrites and, in turn, connects to thousands of other neurons via its axon. The point of contact between an axon of a neuron and a dendrite on another neuron is called a synapse. With respect to the synapse, the two neurons are respectively called pre-synaptic (the sending neuron) and post-synaptic (the receiving neuron). If some event such as an incoming stimulus causes the neuron membrane potential to rise above a certain threshold, the neuron will "fire", sending a spike down its axon. All the synapses that the axon contacts are then activated after an "axonal conductance delay". A neuron can be excitatory, meaning that its firing makes those neurons whose synapses it contacts more likely to fire. Or, a neuron can be inhibitory, meaning that its firing makes those neurons whose synapses it contacts less likely to fire.

Synapses made by excitatory neurons are plastic, i.e., the effect of their activation on the corresponding post-synaptic neuron is subject to change over time using a plasticity rule such as spike-timing dependent plasticity (STDP). A STDP rule potentiates (increases the weight of) a synapse if its post-synaptic neuron fires after its presynaptic neuron fires, and depresses (decreases the weight of) a synapse if the order of two firings is reversed.

As understood herein, to study emergent dynamics and information-processing capacity of large networks of spiking neurons, the simulation network scale is essential. Scale is also important to incorporate distance-dependent axonal conductance delays. As also understood herein, in trying to understand the computational function of the cortex, several hypotheses regarding network topologies, neuron/synapse models, etc., need to be tried out quickly. In addition, to achieve steady state, some simulation experiments may need to run for a long time, such as twenty four hours of simulated time. Thus, simulation time is also of essence.

The present invention critically recognizes that the following challenge exists. The total surface area of the two hemispheres of the rat cortex is roughly six hundred square millimeters, and the number of neurons under each square millimeter of the mouse cortex, which is about the same as the rat cortex, is roughly 92,000, for a total of over fifty million neurons. Taking the number of synapses per neuron to be around eight thousand, there are roughly four hundred billion synapses in the rat cortex.

In view of the above challenge, the present invention further critically recognizes that simulations at this scale in near real-time impose tremendous constraints on computation, communication) and memory capacity of any computing platform. For example, assuming that neurons fire at an average rate once per second, each neuron would communicate with each of its synaptic targets once a second, resulting in an average total of four hundred billion messages per second. Moreover, roughly 80% of the cortical neurons are excitatory, and the state of the synapses made by these excitatory neurons must be updated once a second as per the above-mentioned STDP. For near real-time performance for these synaptic updates, all synapses must fit within the main memory of the system. Finally, in a discrete-event simulation setting, the state of all neurons must be updated every simulation time step which could be 1 millisecond or shorter. At the complexity of neurons and synapses envisioned herein, the computation, communication, and memory requirements all scale with the number of synapses which outnumber the number of neurons by a factor of eight thousand.

SUMMARY OF THE INVENTION

The present invention is for a computerized brain simulation system that can be used to develop novel cognitive systems, computing architectures, programming paradigms, and to explore their practical business/enterprise applications by gaining an operational, computational understanding of how the brain works. Abstract, high-level, phenomenological neuroscience models that are tractable on contemporary supercomputers can be used by the present simulation.

In brief aspects of some embodiments of the invention include a computationally efficient way to simulate neurons in a clock-driven ("synchronous") fashion and synapses in an event-driven ("asynchronous") fashion. Some embodiments provide a memory efficient representation to compactly represent the state of the simulation, while some embodiments provide a communication-efficient way to minimize the number of messages sent by aggregating them in several ways and by mapping message exchanges between processors onto judiciously chosen MPI primitives for synchronization.

Accordingly, in one aspect a distributed computing system is disclosed with N processors modeling a neuronal network including simulated neurons, axons, and synapses. Simulated neurons have respective simulated axons distributed over plural processors. The processors execute logic that includes, when first neurons hosted on respective source processors are simulated to fire to activate synapses to respective second neurons hosted on respective destination processors, sending from each source processor a message indicative thereof to the respective destination processor in a non-blocking fashion. The logic may also include executing synchronization using two communication steps independent of N. These two steps in turn can include sending, from each source processor, a message to a single predetermined processor 0 indicating how many messages the source processor sends to each of its respective destination processors, and then sending, from the single predetermined processor 0, respective messages to the destination processors indicating the total number of messages the respective destination processor receives from the source processors. Each respective destination processor, based on the message it receives from the single predetermined processor 0, retrieves messages intended for the destination processor in a blocking fashion such that there is no possibility of deadlock.

In non-limiting embodiments the logic includes aggregating multiple messages sent from a particular source processor to a particular destination processor. The logic can be executed every computational increment.

If desired, the logic that the processors execute can further include updating neuronal states every computational increment. For simulated excitatory pre-synaptic neurons, a list of input synapses of the neuron that were activated since the most recent simulated firing of the neuron can be established. When a neuron is simulated to fire, for each input synapse of the list, a respective synaptic weight may be increased (potentiated). Moreover, for simulated excitatory pre-synaptic neurons, an ordered list may be established of output synapse classes associated with the neuron, with a synapse class being defined by a respective simulated axonal delay. When a neuron is simulated to fire, a first synapse class that is activated by the simulated firing of the neuron in a nearest future is stored in an event queue. When the first synapse class is simulated to be activated, the event queue is cleared and a next synapse class is stored in the queue.

In the above non-limiting embodiment, for each simulated synapse of an excitatory pre-synaptic neuron, when the simulated synapse is activated by a spike from its pre-synaptic neurons a synaptic weight of the synapse may be decreased (depressed).

The logic executed by the processors may still further include storing information consisting essentially of a synaptic weight, a time step at which the synapse was last activated, a pointer to a next synapse in the list of synapses of a post-synaptic neuron that were activated since the most recent simulated firing of the neuron, a single bit indicating whether the synapse is on the list, and a pointer to the post-synaptic neuron associated with the synapse.

In this last embodiment, no more than sixteen bytes of information per synapse is stored.

In another aspect, a distributed computing system is disclosed with N processors modeling a neuronal network including simulated neurons, axons, and synapses. Simulated neurons have respective simulated axons distributed over plural processors. The processors execute logic that includes updating neuronal states every computational increment. For simulated excitatory pre-synaptic neurons, a list of input synapses of the neuron that were activated since the most recent simulated firing of the neuron can be established. When a neuron is simulated to fire, for each input synapse of the list, a respective synaptic weight may be increased (potentiated). Moreover, for simulated excitatory pre-synaptic neurons, an ordered list may be established of output synapse classes associated with the neuron, with a synapse class being defined by a respective simulated axonal delay. When a neuron is simulated to fire, a first synapse class that is activated by the simulated firing of the neuron in a nearest future is stored in an event queue. When the first synapse class is simulated to be activated, the event queue is cleared and a next synapse class is stored in the queue.

In yet another aspect, a distributed computing system is disclosed with N processors modeling a neuronal network including simulated neurons, axons, and synapses. Simulated neurons have respective simulated axons distributed over plural processors. The processors execute logic that includes storing information consisting essentially of a synaptic weight, a time step at which the synapse was last activated, a pointer to a next synapse in the list of synapses of a post-synaptic neuron that were activated since the most recent simulated firing of the neuron, a single bit indicating whether the synapse is on the list, and a pointer to the post-synaptic neuron associated with the synapse.

In still another aspect, a cortical simulator includes one or more computer processors simulating an animal cortex having neurons and synapses. The processor updates respective states of simulated neurons in a synchronous fashion and updates respective states of simulated excitatory synapses in an asynchronous fashion dependent on whether an associated simulated neuron has been simulated to fire, and then generates an output representative of the cortex.

The details of the present invention, both as to its structure and operation, can best be understood in reference to the accompanying drawings, in which like reference numerals refer to like parts, and in which:

BRIEF DESCRIPTION OF THE DRAWINGS

FIG. 6 is pseudocode listing of preferred non-limiting distributed processor logic.

DETAILED DESCRIPTION OF THE PREFERRED EMBODIMENT

Figure 1:
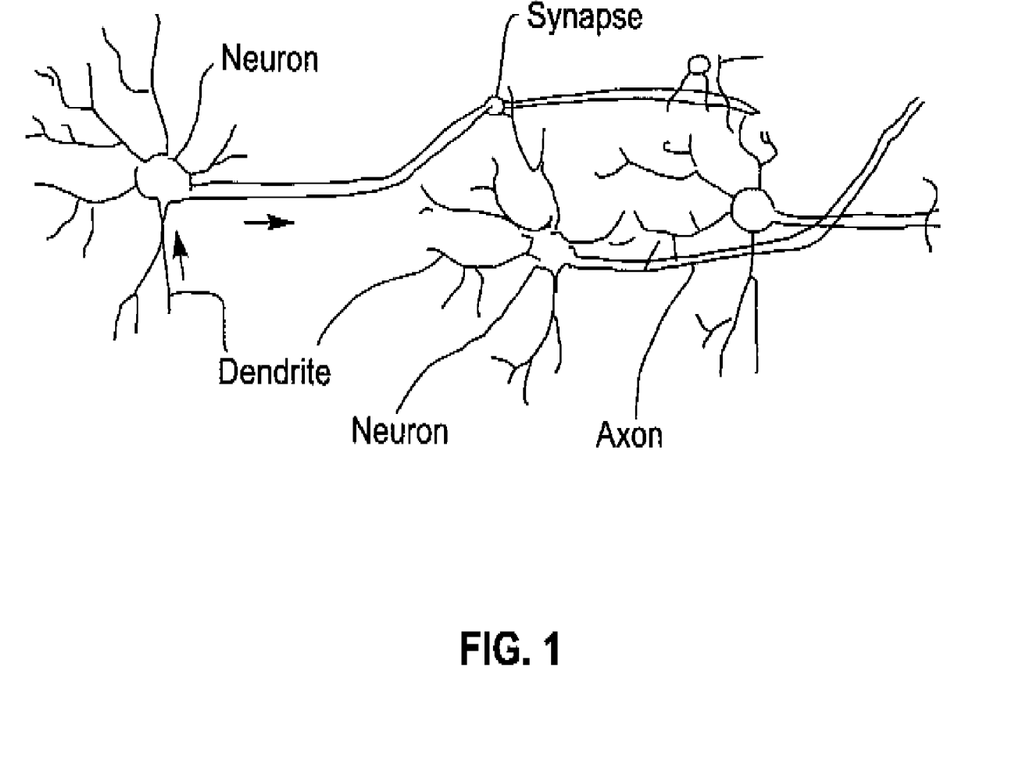
FIG. 1 is a schematic diagram showing neurons, their output axons and input dendrites, and synapses therebetween.

Referring initially to FIG. 1, a schematic diagram is shown illustrating an animal cortex that has neurons, their associated axons over which neurons "fire" what amount to electrical signals, referred to as "spikes", to other neurons, and neuronal dendrites, which receive spikes from other neurons. The junction of an axon and a dendrite is a synapse. In a simplified explanation, an animal's brain functions by the interplay of its neurons with each other through the synapses. Accurately modeling this interplay is of high importance, because among things a good model of the brain can lead to the development of computerized neuronal networks, the development of drugs to inhibit or promote, as desired, communication within the brain, etc. Accordingly, modeling the brain is in and of itself a practical, real world application that can lead to discarding inaccurate models (a valuable outcome) and to further investigations of models that appear to hold promise.

Figure 2:
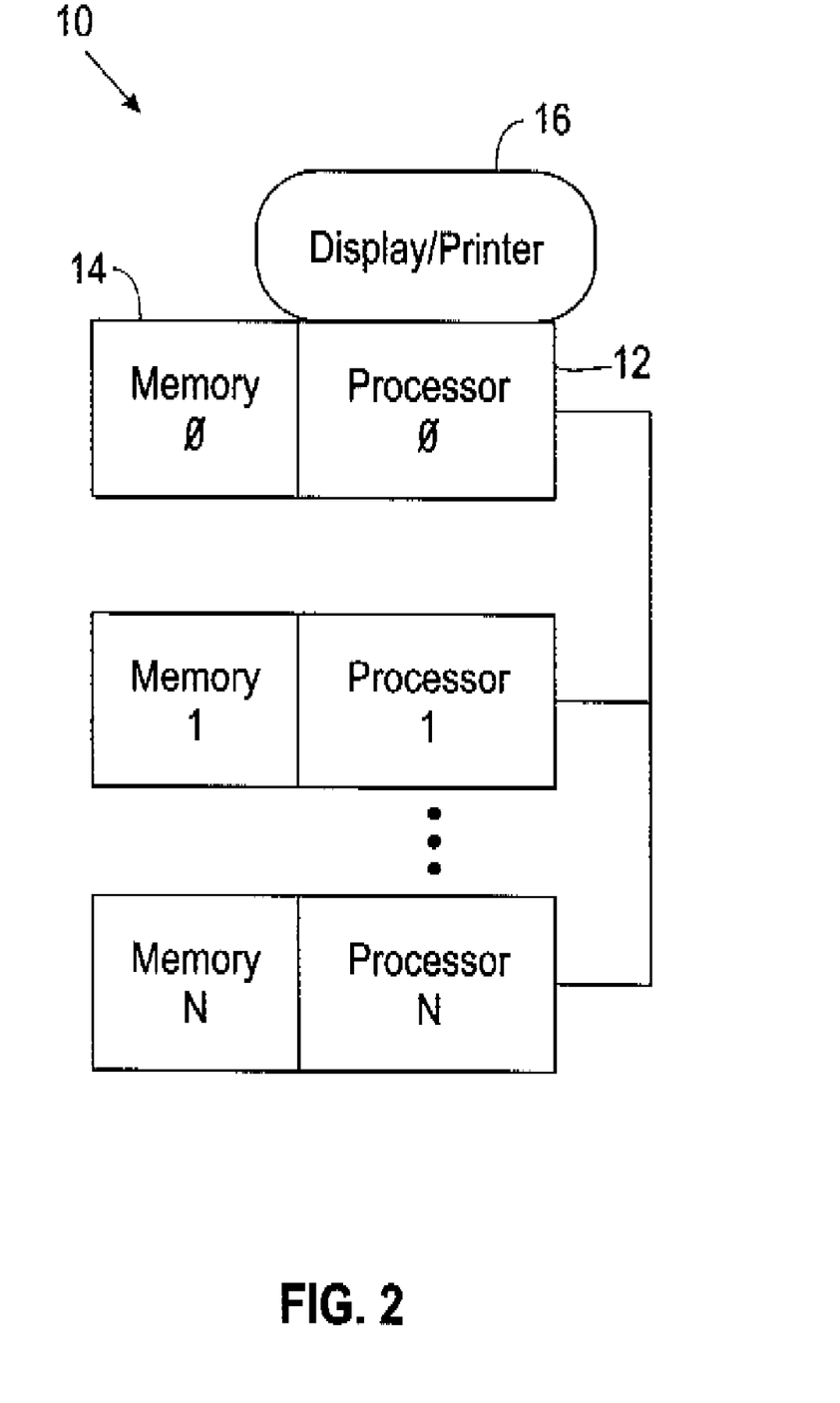
FIG. 2 is a block diagram of a non-limiting system in accordance with present principles.

FIG. 2 shows a non-limiting system 10 that may be used to model the cortex shown in FIG. 1. Only one processor need be used but as set forth further below preferably plural processors 12 operating in parallel are used, with each processor 12 having a respective memory 14 and with at least one processor 12 having an output device 16 such as a printer or monitor or other computer or storage device.

In non-limiting implementations, the system 10 is a supercomputer with 32,768 processors 12, each operating at a clock frequency of 700 MHz. Each memory 14 may have a capacity of 256 MB. Individual simulated neurons are hosted on respective individual processors 12, with, in non-limiting embodiments, 80% of the simulated neurons simulated to be excitatory neurons and 20% simulated to be inhibitory neurons. Other parameters that may be used, in non-limiting embodiments, include a 0.09 local probability of connections and axonal conductance delays of 1-20 milliseconds for excitatory neurons and 1 ms for inhibitory neurons. The simulated neurons (also referred to herein from time to time as simply "neurons") are interconnected in a probabilistic fashion that is discussed further below. It is possible to use available neuro-anatomical data on the short- and long-distance connectivity pattern of the mammalian brain to further refine connectivity pattern. Several connectivity patterns may be tried. In essence, competing models of the brain are established that have respective overall numbers of neurons and numbers of neurons per group of neurons. Other model parameters may be changed if desired, model to model.

Figure 3:
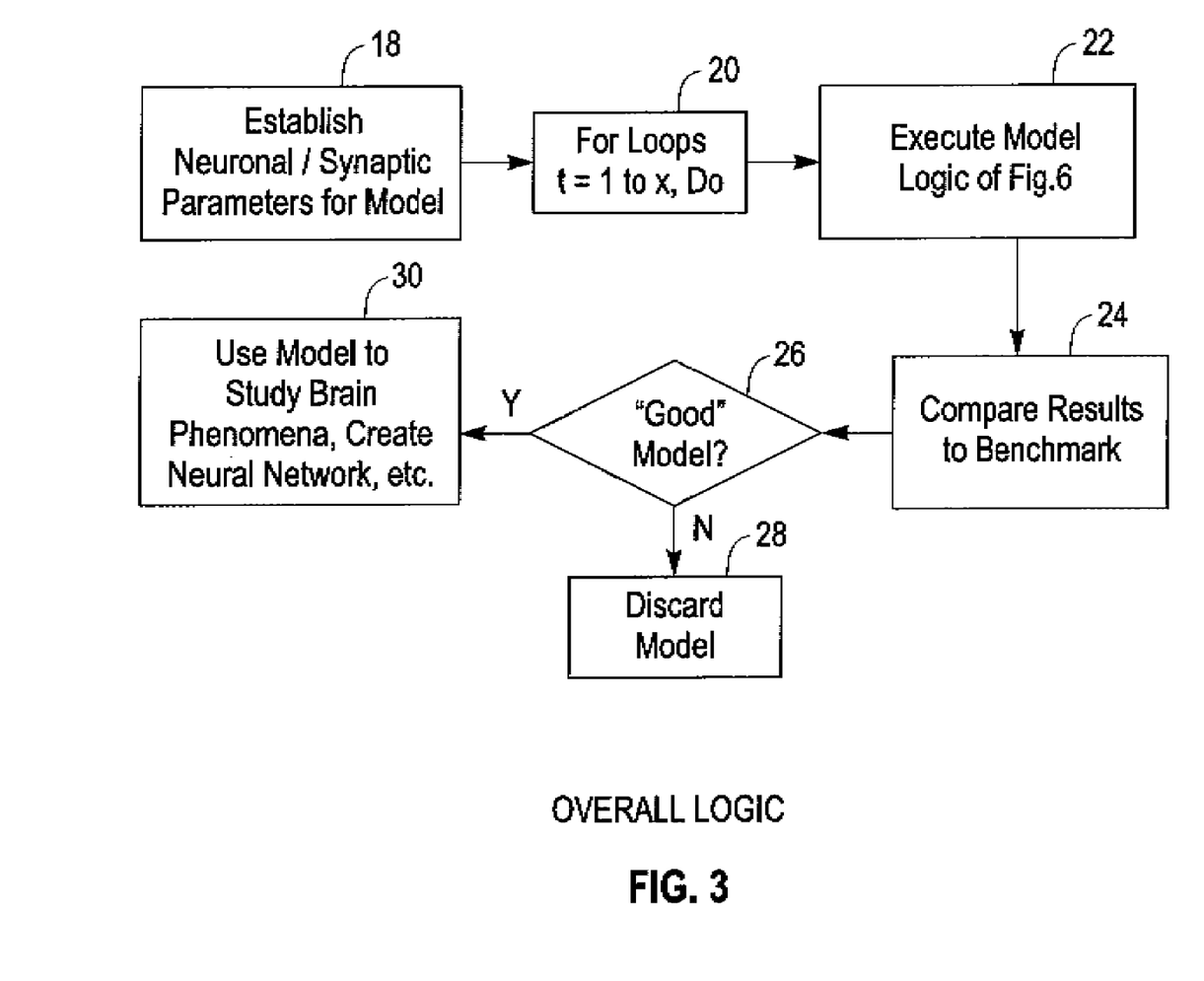
FIG. 3 is a flow chart of the overall logic of the invention.

The overall logic of non-limiting implementations may be seen in FIG. 3. All or parts of the logic can be stored on a computer readable medium such as but not limited to the memory 14 shown in FIG. 2 for execution by one or more of the processors 12.

Figure 5:
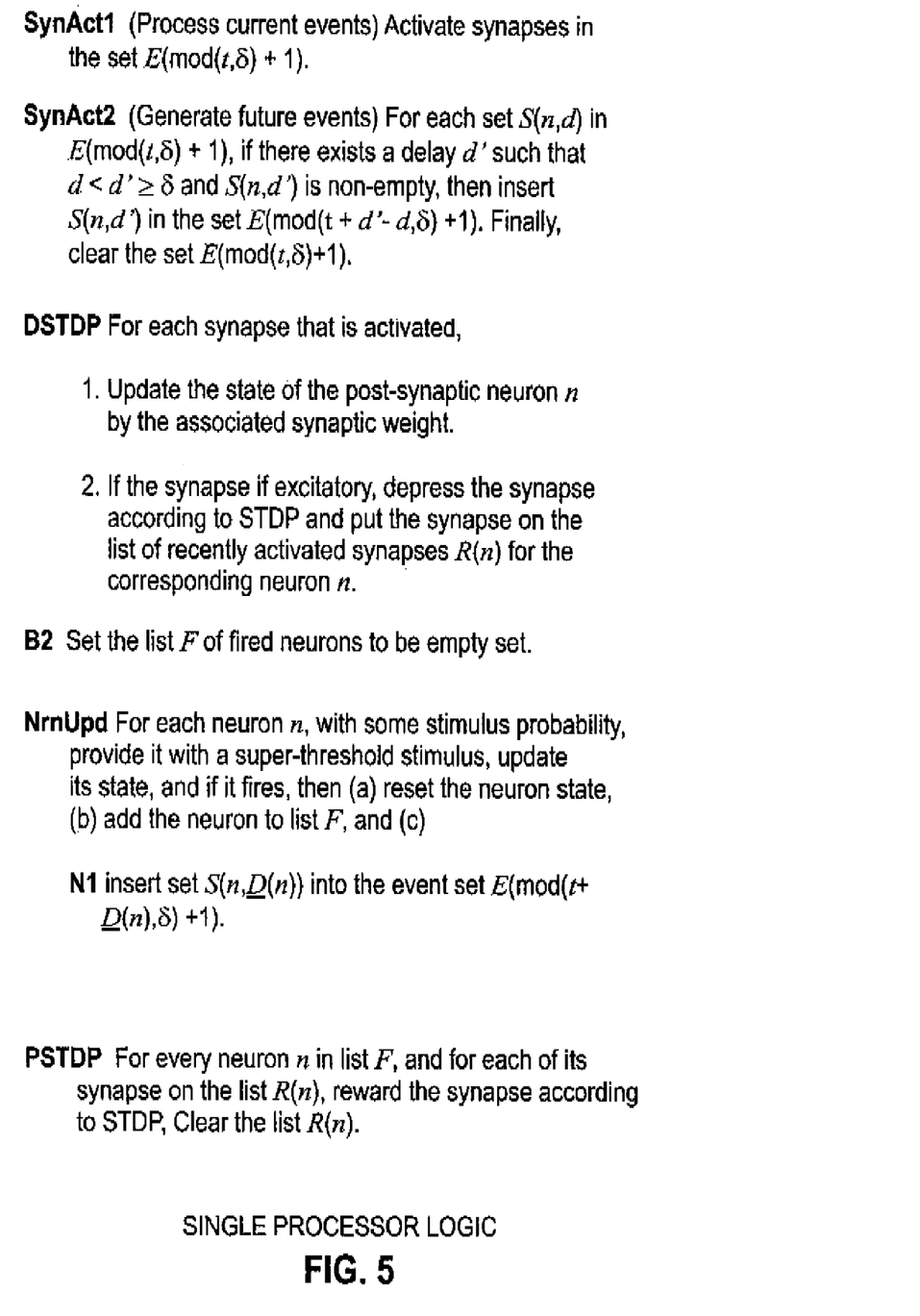
FIG. 5 is a pseudocode listing of single processor logic shown for ease of exposition.

Commencing at block 18, neuronal and synaptic parameters are established for a cortical model to be tested. Some of these parameters have been mentioned above and will be discussed further below. At block 20 the processors 12 execute each of "X" loops, one for each time step "t". In each loop, at block 22 the model logic of FIG. 6, discussed further below, is executed. When only a single processor is used, the logic of FIG. 5 is used. FIG. 3 is a more general illustration of the logic of each loop.

Figure 7:
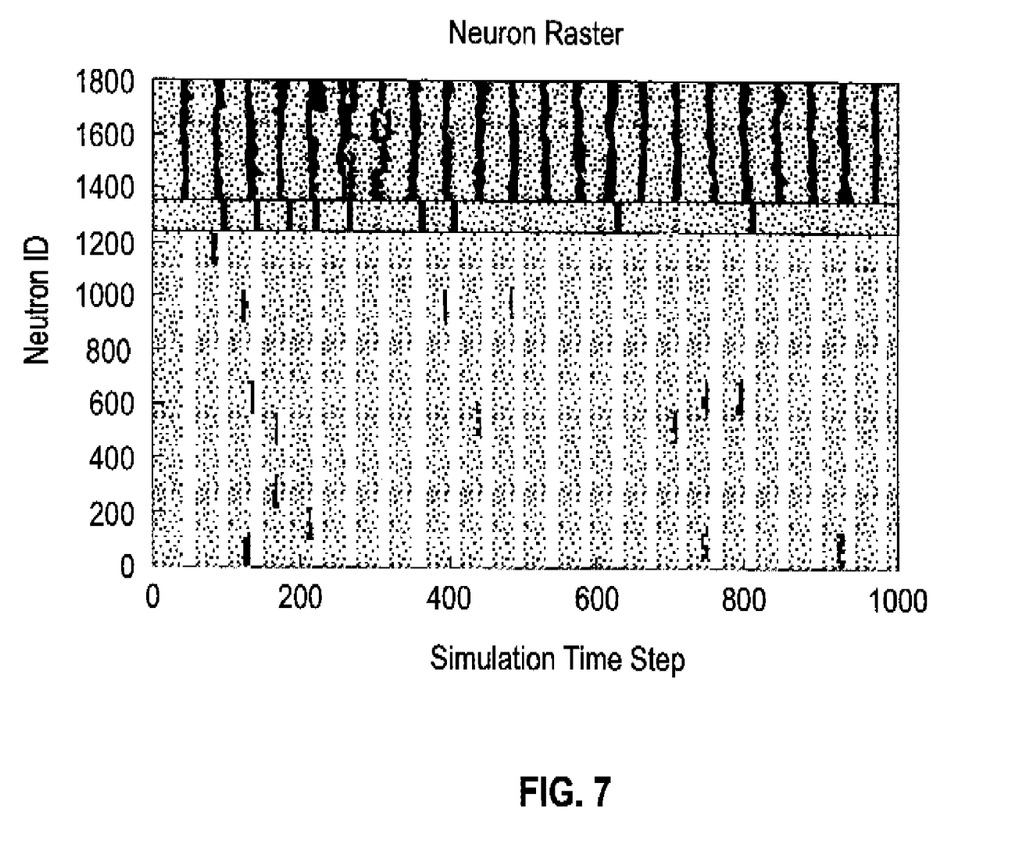
FIG. 7 is a non-limiting example of an output graph of the present processing.

At the end of the desired number of computational loops, the results of the processing may be compared to a benchmark at block 24. The results may be the graph shown in FIG. 7 and may be visually compared to a benchmark that may be the actual brain wave measurements of an animal, to determine how closely the results match the benchmark. The non-limiting example of FIG. 7 is a raster plot of selected neurons for the first 1000 simulation steps of a model with 450,560 neurons using 256 processors. The plot corresponds to sixteen groups comprising 1,760 neurons per group assigned to processor 0. Similar results are obtained for other neuronal groups. The four groups in the top quarter of the graph are inhibitory, the rest (in the bottom three-quarters of the graph) are excitatory. In this graph, a dot is plotted at (t, n) if a neuron n fires at time step t. The graph shows that the inhibitory groups have a visibly higher firing rate than excitatory groups, as evidenced by the density of the dots. Neuronal firing occurs in a fairly synchronized manner, but involve different groups at different times. Some groups exhibit aperiodic behavior as exemplified by Group 12 (neurons between the two horizontal lines).

Or, the comparison step at block 24 may executed by one or more of the processors 12 using, e.g., a least-squares fit against the benchmark.

In any case, if the comparison at block 24 indicates, at decision diamond 26, that the model under test was not a "good" model as indicated by a failure to match the benchmark to within some predetermined accuracy, then the model may be discarded at block 28. Knowing that a particular model is not likely to provide an accurate understanding of actual brain functioning in and of itself is valuable and practical. On the other hand, if decision diamond 26 indicates that the model under test appears promising, the model may be used at block 30 for a variety of purposes, e.g., studying brain phenomena, creating a computerized neural network, developing pharmacological agents that, e.g., inhibit or promote, as desired, synaptic connections, etc.

Yet again, the set of all neurons being simulated can be divided into three populations, namely, S ("sensory inputs"), A ("actuators"), and I ("inter-neurons"). The number of neurons in S and A are relatively very small to the number of neurons in I. A wide variety of spatio-temporal inputs can be fed to S and a wide variety of actuator outputs extracted from A. The sensors/actuators can be abstract and can be used in multiple different applications differently. In one specific embodiment, these can correspond to physical sensors and actuators on a robot. In another specific embodiment, these can correspond to sensors and actuators connected to a virtual being in a video game or second-life like virtual world. In another specific embodiment, these can be abstract sensors and actuators, for example, sensors that collect from a data center all the machines that are working and not working and the actuators can be outputs on the screen or adjustments to controls. In another embodiment, sensors can be all the weather data throughout the world and actuators can be a set of alarm signals. These are but a few examples of why a system modeling a brain is useful and practical.

Figure 4:
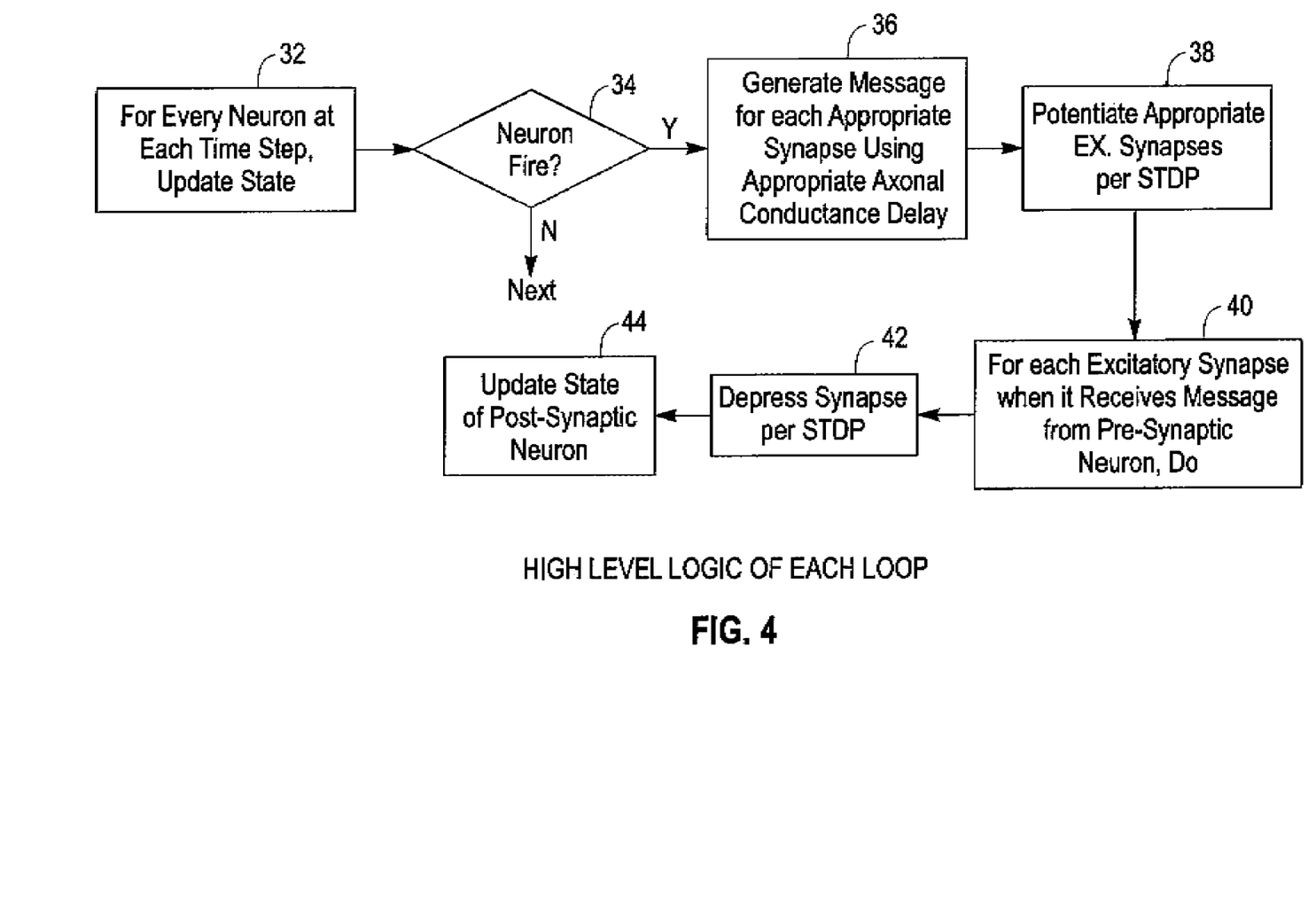
FIG. 4 is a flow chart of the high level logic of each computational loop.

FIG. 4 shows the overall logic of a computational loop executed at block 22 of FIG. 3. Neuronal and synaptic dynamics preferably are modeled using difference equations and spike times and the axonal conductance delays are discretized to a grid, for example, 1 ms, cortical simulations can be thought of in the framework of discrete-event simulations. The state of each neuron is updated at every time step, that is, in a clock-driven or synchronous fashion, whereas the state of each excitatory synapse is updated in an event-driven or asynchronous fashion when either the corresponding presynaptic or post-synaptic neuron fires.

Accordingly, at block 32, for every neuron and for every simulation time step, the state of each neuron is updated. If it is determined at decision diamond 34 that the neuron fires, a message (an event) is generated at block 36 for each synapse for which the neuron is pre-synaptic at an appropriate future time corresponding to the axonal conductance delay associated with the synapse. Also, if the neuron fires, at block 38 the synapses for which the neuron is post-synaptic are potentiated (their weight is increased) according to a spike-timing dependent plasticity (STDP) that is established for the model under test.

Moving to block 40 for an understanding of the event-driven (asynchronous) portion of FIG. 4, for every synapse receiving a message from its presynaptic neuron, the synapse is depressed (its weight is decreased) according to the STDP at block 42, and at block 44 the state of its post-synaptic neuron is updated.

Prior to moving to specific implementations of FIG. 4 as shown in FIGS. 5 and 6, an overview of some algorithmic features will be given in terms of relevant computation, memory, and communication features. To enable a true event-driven processing of synapses, for every neuron, a list of synapses may be maintained. The list includes synapses that were activated since the last time the neuron fired. The recently activated synapses can be cached. This list is useful when potentiating synapses according to STDP when a post-synaptic neuron fires. Typically, the size of this list is far smaller than the total number of synapses attached to the neurons.

Also, for each neuron an ordered list is maintained of equivalence classes of synapses made by the neuron that have the same delay along its axon. Once a neuron fires, the class of synapses that will be activated in the nearest future need be stored in an event queue, and, proceeding recursively, when that class of synapses is activated, the next class of synapses is inserted into the queue at an appropriate future time in the queue. This recursion is useful when depressing synapses according to STDP.

With respect to memory, because synapses outnumber neurons by a factor of 8,000, the scale of models is essentially limited by the number of synapses that will fit in available memory and by the required transient memory. The above recursive structure for storing events reduces the transient memory necessary for buffering spikes. Additionally, minimal storage is used for each synapse. The data stored for each synapse consists of the synaptic weight, the time step at which the synapses was activated (for STDP calculation), the pointer to the next synapse of the activated synapse list, one bit indicating whether a synapse is on the list of activated synapses, and a pointer to the post-synaptic neuron, for a total of only sixteen bytes per synapse.

With respect to communication, in the preferred algorithm all dendrites of a neuron always reside with it on the same processor 12, but its axon may be distributed. With this assumption, all synapses made by an axon on a distant processor can be activated with a single message thus reducing the number of messages from the order of synapses to the order of average number of processors that a neuron connects to. Furthermore, multiple axons originating from a processor may travel to the same destination processor enabling further message aggregation (and thus reduction in the number of messages) depending upon the average neuronal firing rate.

Considering optimizations in the choice of communication primitives, assuming N distributed processors over which the neurons are distributed, the destination processor D of a message does not know that a particular source processor S is sending it a message and, hence, the two processors must synchronize. As set forth further below, each source processor simply transmits the message in a non-blocking fashion. Then, a synchronization scheme is used that requires only two communication steps independent of the number of the processors to synchronize. In the first ("Reduce") step, each processor sends to a predetermined processor, e.g. processor 0, a message indicating how many messages it intends to send to every other processor, and in the second ("Scatter") step, the predetermined processor 0 sends to each processor the combined total number of messages that it should receive from all the other processors. Equipped with this knowledge, each processor can now retrieve the messages destined for it in a blocking fashion. Consequently, there is no possibility of deadlock. The choice of communication primitives leverages knowledge of the application at hand.

With the above in mind and now turning to the single processor algorithm of FIG. 5, assuming that all simulated neuronal spikes are discretized to a grid with 1 ms resolution, the axonal delay of every neuron is an integer in the range of one to $\delta$, where $\delta$ is in effect the event horizon.

For a neuron n, S(n,d) denotes the set of synapses to which its axon connects with delay d. For some delay d, the set S(n,d) can be empty. $\underline{D}(n)$ denotes the smallest delay such that the corresponding set of synapses S(n, $\underline{D}(n)$) is non-empty.

E(i), $1 \leq i \leq \delta$ denotes the set of synapses to be activated in the future. These event sets are organized in a circular queue of length $\delta$ such that the set of events E(mod(t,$\delta$+1) will be processed at time t. All sets E(i) are initialized to be empty.

FIG. 5 shows a single time step in the single processor example. The steps SynAct1, SynAct2, DSTDP, and PSTDP deal with synaptic computation, while the step NrnUpd deals with neuronal computation. Step 82 is a bookkeeping step. The steps SynAct1, SynAct2, DSTDP, and PSTDP are event-driven as discussed above and are asynchronous in nature, whereas step NrnUpd is clock-driven and is synchronous.

Thus, while every neuron is updated at every time step, the synapses are processed only when either they are activated by an incoming message or their corresponding post-synaptic neuron fires. Furthermore, for each neuron n, a list R(n) of synapses is maintained that have been activated since the last time the neuron fired. Typically, the size of list R(n) is significantly smaller than the total number of synapses that the neuron is post-synaptic to, and, hence, step PSTDP can be executed with considerable speed. The step N1 is a crucial link that connects the synchronous computation in NrnUpd to event-driven computation in SynAct1, SynAct2, and DSTDP. When extending the single processor algorithm to distributed setting of FIG. 6, several new steps are introduced to implement a similar link.

In greater detail step SynAct1 extracts all synapses that need to be activated at this time step. Essentially, the set E(mod(t,$\delta$+1)={S(n1,d1),S(n2,d2), ... } is a union of sets of synapses with whom axon of neuron n1 makes contact after delay d1, and axon of neuron n2 makes contact after delay d2, and so on. All these synapses are activated now and further processed as per Step DSTDP.

For each set S(n,d)inE(mod(t,$\delta$+1), step SynAct2 finds the next set of synapses that will be activated by the neuron n (which fired exactly d time steps ago). Specifically, this step looks for the next delay d' that is larger than d but yet not larger than the maximum possible delay $\delta$, and if it does find a meaningful d' then it inserts S(n,d') in the set E(mod(t+d'−d, $\delta$+1) which will be accessed by Step SynAct1 at d'−d time steps in the future.

Step DSTDP carries on from where SynAct1 started. Each eligible synapse is activated, and, each synapse, in turn, updates the state of its post-synaptic neuron. Furthermore, if the synapse is excitatory, then it is depressed according to STDP rule. Specifically, if time $\Delta$ has elapsed since the corresponding post-synaptic neuron fired, then the synapse is depressed by $A\_exp(-\Delta/\tau\_)$, where $\tau\_$ is the half-life and $A\_$ is a constant. The synaptic weight is never allowed to go below zero. Further non-limiting details are set forth below and in Song et al., "Competitive Hebbian Learning through Spike-Timing Dependent Synaptic Plasticity", *Nature Neuroscience,* 3:919-926 (2000), incorporated herein by reference.

While some simulation frameworks do not assume any specific form of neuron, phenomenological neurons can be chosen. Each neuron can have two state variables (v,u), where v represents the membrane potential of the neuron and u represents a membrane recovery variable. So, in Step NrnUpd, for each neuron (v,u) are updated, and if a particular neuron fires, then its state is reset, it is added to the list of fired neurons, and it generates a future event where its firing will be communicated to those synapses that its axon contacts. Specifically, the set S(n,$\underline{D}(n)$) represents the set of synapses that the axon of neuron n will reach after a time delay $\underline{D}(n)$, and, hence, a future event corresponding to this is inserted in E(mod(t+$\underline{D}(n)$,$\delta$)+1) in Step N1.

Finally, for each fired neuron n, Step PSTDP rewards (potentiates) all synapses attached to it that are on the list R(n) according to the STDP rule $A+exp(-\Delta/\tau+)$, where $\Delta$ is the elapsed time since the synapse was activated, $\tau+$ is the half-life, and A+ is a constant. The synaptic weight is never allowed to go above a constant W+. Finally, the weights of every non-plastic synapse made by inhibitory neurons is set to a constant W−. These network parameters in non-limiting embodiments are specified further below.

Turning to the distributed multiprocessor algorithm of FIG. 6, in a distributed setting, to exploit the combined memory and computation power of multiple processors, neurons are distributed across them. It is assumed that a neuron and all synapses that it is post-synaptic to always reside on the same processor, but that its axon can be distributed over multiple processors.

Let N denote the total number of processors. For neuron n on processor x, let S((n,x),d;y),$1 \leq d \leq \delta$, denote the set of synapses that it makes on processor y with axonal delay d. For every neuron-processor pair(n,x) such that the union (d from 1 to $\delta$) of S((n,x),d;y) is not empty, it is ensured that processor y knows these sets of connections during the initial set-up. In other words, for every axon from a non-local neuron that comes to a processor, all its contacts and delays are locally known. $\underline{D}(n,x;y)$ denotes the smallest delay such that the set of synapses S((n,x),$\underline{D}(n,x;y)$;y) is non-empty.

For each processor x, the event sets $E^x(i)$, $1 \leq i \leq \delta$, are initialized to be empty. The meaning and use of these sets is analogous to the sets E(i) in the above-discussed single processor setting. Note that E(i)=the union (x from 1 to N) of $E^x(i)$, $1 \leq i \leq \delta$.

Steps SynAct1, SynAct2, DSTDP, PSTDP, and B2 in FIG. 6 are in essence identical to their counterparts in FIG. 5, whereas NrnUpd, FlshMsg, MeX1, and MeX2 are new and are described in detail below. These new steps are intended to carry the step N1 in the distributed setting.

In Step NrnUpd, when a neuron n on processor x fires, it needs to send a message to every processor y to which its axon travels. Only one message per target processor is sent even though a neuron may make multiple synapses with neurons on the target processor. In some implementations, each axon typically makes eighty synapses with each processor that is connects with, thus leading, with the present inventive feature, to a reduction in the number of messages by a factor of eighty. Furthermore, when a neuron n on processor x fires, the message is not necessarily sent instantly to every processor that the neuron connects to. Instead, multiple firings of neurons whose axons also travel from processor x to processor y are aggregated in a single message to reduce communication overhead. As the average neuronal firing rate increases, the advantage of this optimization increases further.

Step FlshMsg cleans up any remaining messages which have not yet become full after all neurons have been processed. Steps NrnUpd and FlshMsg keep track of how many messages are sent from processor x to any given processor y in variable Mx(y). All messages are sent in a non-blocking fashion.

Observe how the messages are sent in NrnUpd and FlshMsg before local computation in Step PSTDP proceeds. By delaying computation in PSTDP which can be also placed between NrnUpd and FlshMsg, communication is allowed to overlap computation, thus hiding communication latency.

Finally, in Step MeX1, by using MPI ReduceScatter, for each processor x the number of incoming messages that it expects to receive is determined. This removes all ambiguity from message exchanges. Now, in Step MeX2, processor x simply receives M(x)=sum of (y from 1 to N) My(x) messages that it is expecting in a blocking fashion. As explained above, steps MeX1 and MeX2 significantly reduce the communication and synchronization costs.

After receiving the messages, in Step N1, appropriate events are set up in the future so as to activate relevant synapses as per the applicable axonal delay. In essence, Step N1 of FIG. 5 is now represented by Step NrnUpd (Part(c)), FlshMsg, MeX1, MeX2, and N1 of FIG. 6.

It is assumed that inhibitory neurons can connect only to excitatory neurons, while excitatory neurons can connect to either type. To describe non-limiting implementations from another standpoint, let H($\alpha$, $\beta$, $\gamma$, $\delta$) denote a random a random directed graph with $\alpha$ vertices and $\beta$ outgoing edges per vertex. Each vertex represents a group of $\gamma$ neurons. The total number of neurons is $\alpha$ times $\gamma$. A group of neurons does not have any biological significance. There are $\alpha$ times 0.8 excitatory groups and $\gamma$ times 0.2 inhibitory groups. Each excitatory group sends $\beta$ edges randomly to one of the $\alpha$ groups, while each inhibitory group sends $\beta$ edges randomly to one of the excitatory groups. Each edge originating from an excitatory group has an integer axonal delay chosen randomly from the interval [1,$\delta$], while each edge originating from an inhibitory group has a fixed axonal delay of 1 ms. If there is a directed edge from group G1 to G2, then a neuron in group G1 connects with a neuron in group G2 with probability 8000/($\beta \times \gamma$). Assume that $\beta$=100 and $\delta$=20 ms. For brevity, G($\alpha$,8,7)=H($\alpha$100,$\gamma$, 20). Ten different models may be hypothesized with respective numbers of neuron groups ($\alpha$) and neurons per group ($\gamma$), and the logic above executed for each one to determine which model best matches the benchmark.

As understood herein and mentioned above, the dynamics of cortical networks depend upon many parameters such as neuronal dynamics, synaptic dynamics, network topology, nature and frequency of external stimulation, constants W+, A+ and A−, etc. In some embodiments a stable rhythmic regime may be postulated, such as that described in Vogels et al., "Neural Network Dynamics", *Annual Review of Neuroscience,* 28:357-376 (2005). Further, a regime may be used that produces an effective average neuronal firing rate higher than the stimulus rate. To achieve this regime, various network parameters may be chosen as follows. The event horizon $\delta$ can be set equal to 20 ms. Both constants $\tau$ discussed above may be set equal to 20 ms, A_ may be set equal to 0.00264, and A+ may be set equal to 0.0022. The weights of plastic synapses made by excitatory neurons can be upper bounded by W+=0.22 mV. The weights of non-plastic synapses made by inhibitory neurons can be set to W−=−0.11 mV. The constant a may be set equal to 0.02, b=0.2, c=−65, and d=8, corresponding to regular spiking for the excitatory neurons and [a=0.1, b=0.2, c=−65, d=2] corresponding to fast spiking for the inhibitory neurons. Instantaneous (memoryless or delta function) synapses can be postulated.

A random stimulus probability of 6 Hz may be used, meaning that at each simulation time step of one millisecond each neuron is given a super-threshold stimulus of 20 mV with probability 0.006. This results in an average neuronal firing rate of roughly 7.2 Hz. Simulations may be run for five seconds of model time, i.e., five thousand time steps.

In some implementations all neurons in a group are always placed on the same processor 12. Different groups may also be collocated on the same processor. To achieve load balancing in computation and memory, the same number of groups may be placed on each processor to keep the total number of neurons per processor to 1,760. Furthermore, to achieve load balancing in communication and memory, groups can be assigned to processors such that variability in the number of processors connected to any given processor is reduced. Moreover, although only one in five neurons may be modeled to be inhibitory, sixty percent of all firing is inhibitory, meaning that it is also important to balance the inhibitory neurons among the processors to reduce variability in firing across processors. Recall that the axon of a neuron may travel to multiple processors, and that on each processor all the synapses that the axon makes must be stored.

Some of the above implementations focus on simulations that can easily be scaled in terms of number of neurons and synapses to benchmark model performance. In alternate embodiments large-scale spiking networks may be modeled for information processing. These networks exhibit extremely complex dynamics that is hard to encapsulate in just a few measurable values such the firing rate, etc., and, hence, to facilitate a deeper understanding, the state of the simulation can be visualized as it evolves through time. Also, numerous neurobiological details and constraints such as white matter and gray matter connectivity can be accounted for, as well as neuromodulators, thalamocortical and corticothalamic connections, and dynamic synapses. Thus, details that are relevant to understand how various neurological details affect the dynamical, operational, computational, information processing, and learning capacity of the cortical simulator can be accounted for. With a view towards applications, a wide array of synthetic and real spatiotemporal stimuli can be investigated using present principles.

While the particular SYSTEM AND METHOD FOR CORTICAL SIMULATION is herein shown and described in detail, it is to be understood that the subject matter which is encompassed by the present invention is limited only by the claims.

What is claimed is:

1. A distributed computing system with N processors modeling a neuronal network including simulated neurons and synapses, the processors executing logic stored on at least one computer-readable medium, the logic comprising:

when first neurons hosted on respective source processors are simulated to fire to activate synapses to respective second neurons hosted on respective destination processors, sending from each source processor a message indicative thereof to the respective destination processor;

executing synchronization using two communication steps including:

sending, from each source processor, a message to a single predetermined processor 0 indicating how many messages the source processor sends to each of its respective destination processors;

sending, from the single predetermined processor 0, respective messages to the destination processors indicating the total number of messages the respective destination processor receives from the source processors, wherein each respective destination processor, based on the message it receives from the single predetermined processor 0, retrieves messages intended for the destination processor;

for at least some simulated neurons, at every computational increment, updating a respective neuronal state;

for each of at least some simulated excitatory neurons, establishing a list of input synapses of the neuron that were activated since the most recent simulated firing of the neuron;

when an excitatory neuron is simulated to fire, for each input synapse of the list, increasing a respective synaptic weight;

for each of at least some simulated neurons, establishing an ordered list of output synapse classes associated with the neuron, a synapse class being defined by a respective simulated axonal delay;

when a neuron is simulated to fire, storing in an event queue only a first synapse class that is activated by the simulated firing of the neuron in a nearest future;

when the first synapse class is simulated to be activated, clearing the event queue and storing in the event queue a next synapse class;

for each simulated input synapse of an excitatory neuron, when the simulated synapse is activated by a spike from its pre-syntactic neuron, decreasing a synaptic weight of the synapse; and for each of at least some simulated synapses, storing information consisting essentially of a synaptic weight, a time step at which the synapse was last activated, a pointer to a next synapse in the list of synapses of a post-synaptic neuron that were activated since the most recent simulated firing of the neuron, a single bit indicating whether the synapse is on the list, and a pointer to the post-synaptic neuron associated with the synapse.

* * * * *